May 21, 1940. H. L. BIRD Re. 21,453
APPARATUS FOR DISPENSING LOOSE SALT IN MEASURED QUANTITIES INTO CANS OR THE LIKE
Original Filed March 18, 1932 2 Sheets-Sheet 1
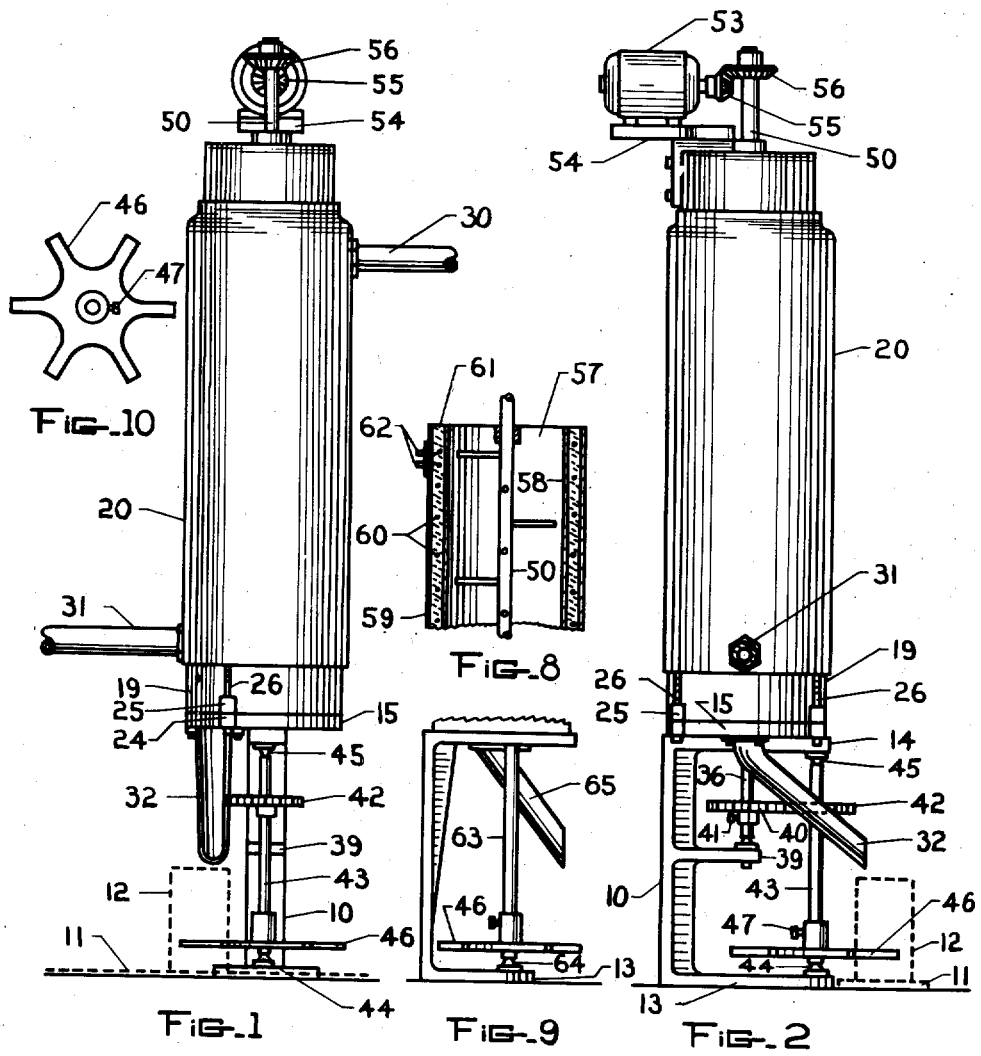
Inventor
Harvey Lee Bird
By Roy A. Plant
Attorney May 21, 1940. H. L. BIRD Re. 21,453
APPARATUS FOR DISPENSING LOOSE SALT IN MEASURED QUANTITIES INTO CANS OR THE LIKE
Original Filed March 18, 1932 2 Sheets-Sheet 2
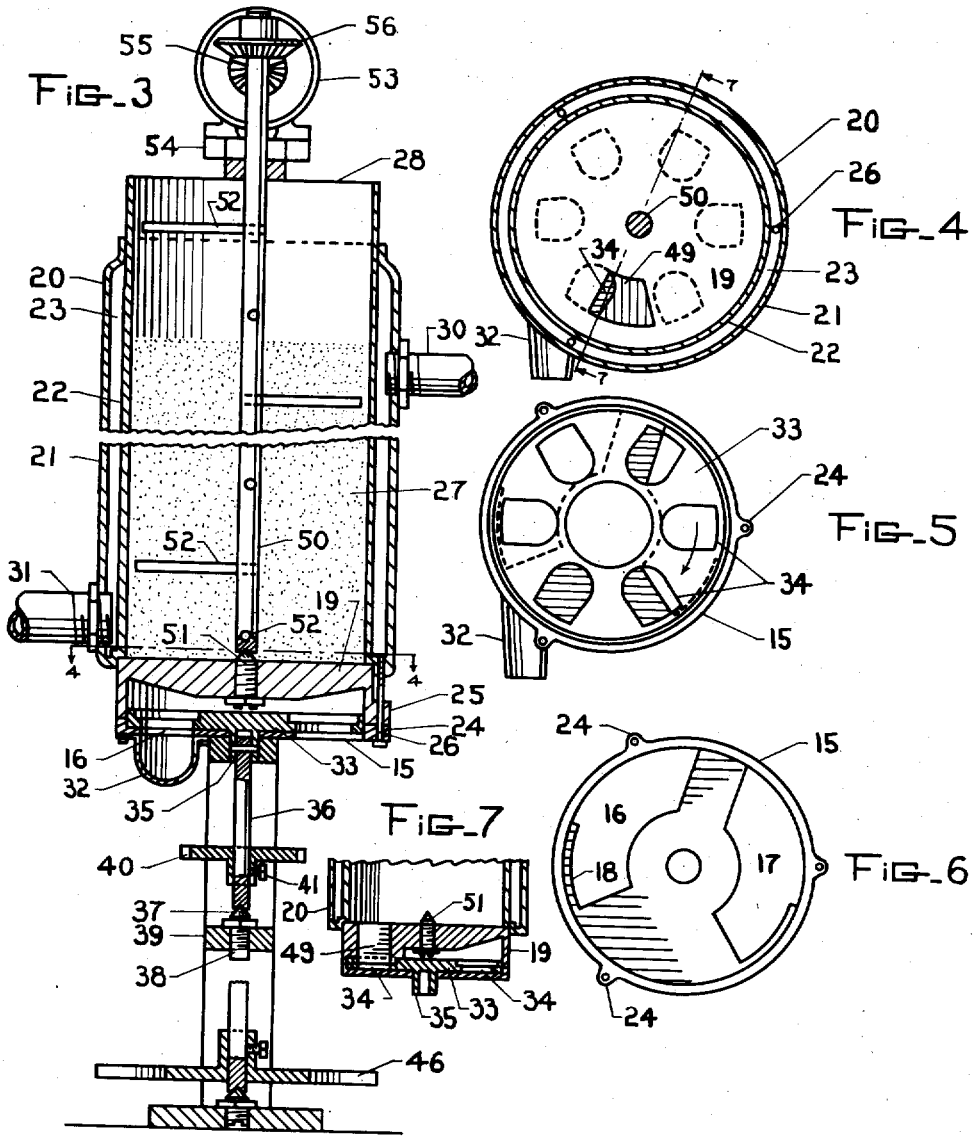
Inventor
Harvey Lee Bird
By Roy A. Plant
Attorney Reissued May 21, 1940

Re. 21,453

UNITED STATES PATENT OFFICE 21,453

APPARATUS FOR DISPENSING LOOSE SALT IN MEASURED QUANTITIES INTO CANS OR THE LIKE

Harvey Lee Bird, Ann Arbor, Mich.

Original No. 1,993,587, dated March 5, 1935, Serial No. 599,804, March 18, 1932. Application for reissue July 11, 1935, Serial No. 30,891

19 Claims. (Cl. 226—99)

The invention relates to machinery intended and adapted for use in canning factories and has for its principal and general object, broadly stated, the provision of a machine by means of which salt in a predetermined quantity may be placed within cans of vegetables or other food products preparatory to sealing of the cans.

An important object of the invention is to provide a machine of this character beneath which may be moved a succession of filled cans carried by a conveyor or belt moved by any desired means, the arrangement being such that the movement of the cans along the belt or conveyor will operate to supply the necessary power to the machine for effecting dropping of salt into the successive cans.

A very important object of the invention is to provide a salt dropping machine of this character provided with means whereby the salt, a material that tends to become moist and non-free flowing in the presence of moist air, may be dried and kept dry so that the machine cannot clog but will remain constantly in operative condition, this feature being of great importance as it is well known that canning factories are usually very damp with the result that the ordinary types of machines attempted to be used fail on account of clogging and caking of the salt.

A further object of the invention is to provide a salt dropping machine of this character embodying motor driven agitating means moving within the mass of salt for breaking it up and preventing hardening thereof as the result of the drying out process, this agitating means insuring a proper feed to the discharge outlet from the machine.

A further object of the invention is to provide a machine of this character embodying a rotatably mounted dropper operating in synchronism with a star wheel which is itself engaged and moved by the succession of filled cans movable along the belt or conveyor so that no additional power will be needed other than that necessary for stirring and agitating the mass of salt itself.

Yet another object is to provide a machine of this type in which the bottom portion of the hopper is of novel and peculiar formation so that no great weight will come upon the moving part, this feature insuring free and easy movement and avoiding binding even under the most adverse circumstances.

An additional object is to provide a salt dropping machine for this purpose which will be simple and inexpensive to make, easy to assemble and operate, positive in action, efficient and durable in service, and a general improvement in the art.

With the above and other objects and advantages in view, the invention preferably consists in the details of construction and the arrangement and combination of parts to be hereinafter more fully described and claimed, and illustrated in the accompanying drawings, in which:

Figure 1 is a side elevation of the machine.

Figure 2 is an elevation taken at right angles to Figure 1.

Figure 3 is a vertical longitudinal sectional view on a somewhat larger scale.

Figure 4 is a horizontal cross section taken on the line 4—4 of Figure 3 and looking downwardly.

Figure 5 is a plan view of the dropping disk and associated parts.

Figure 6 is a plan view of the bottom plate, and

Figure 7 is a detail cross sectional view taken on the line 7—7 of Figure 4.

Figure 8 is a longitudinal or vertical sectional view through the upper portion of the machine illustrating a construction using an electric heater.

Figure 9 is a side elevation of the lower portion of the machine showing a modification of the drive mechanism.

Figure 10 is a detail plan view of the star wheel.

Referring more particularly to the drawings, the numeral 10 designates a supporting base which may be formed as a single casting of angular form or which may be constructed of any necessary or desirable number of parts secured together, this detail being immaterial. It is intended that the machine carried by and including the base be mounted adjacent a moving belt or conveyor 11, indicated in Figures 1 and 2 which carries the cans 12, shown by dotted lines in the same figures, into which predetermined quantities of salt are to be placed. The base 10 is represented as including a horizontal foot portion 13 which may be bolted down or otherwise secured, and a horizontal upper portion 14 which supports the machine itself.

Rigidly secured in any preferred manner upon the horizontal top portion 14 of the base 10 is a bottom plate 15 formed with openings 16 and 17 of segmental shape and provided with an interrupted inwardly extending flange 18 constituting a bearing for a distributing disk to be described. One purpose of the openings 16 and 17 is to reduce friction when the distributor disc 33 is rotated in contact therewith. Mounted upon the top or upper edge of this bottom plate 15 is a hopper bottom 19 of circular form which supports a hopper indicated as a whole by the numeral 20, this hopper being of double walled construction and including an outer wall 21 and an inner wall 22 spaced apart to define an annular chamber 23 for a purpose to be described. This hopper 20, which is preferably of elongated tubular construction as shown in the drawings, may be secured with respect to the bottom 19 and bottom plate 15 in any desired manner though in the present instance I have represented the bottom plate 15 as formed with outstanding ears 24 and the hopper bottom 19 as formed with similar outstanding ears 25, through which sets of ears pass bolts 26 threaded into suitably tapped holes at the lower edge of the hopper 20 as clearly indicated in Figure 3.

The hopper is intended for the reception of a quantity of salt 27 which is carried within the chamber defined by the inner wall 22. This chamber is open at the top, as shown, so that the salt may be conveniently deposited therein.

It is necessary to keep the salt dry so as to prevent clogging and it is for this reason that the annular chamber 23 is provided. Connected and communicating with this chamber are inlet and outlet pipes 30 and 31 respectively for the introduction and exit of steam or hot air, whichever may be found most suitable for the purpose. Clearly, any valve mechanism may be connected with the pipes 30 or 31 for controlling the flow but they are unnecessary to be shown.

The bottom plate 15 has secured to its underside beneath the opening 16 a downwardly extending inclined discharge chute 32 which has its lower end terminating at a level slightly above the tops of the cans 12 into which salt is to be deposited.

Rotatably mounted upon the bottom plate 15 is a distributor disk 33 formed adjacent its periphery with a plurality of pockets 34 and having a central depending hollow hub portion 35 rotatable through a central opening in the bottom plate 15 and telescopically receiving and secured to the upper end of a drive shaft 36 which has its lower end formed for example with a recess or depression bearing upon the conical upper end 37 of a stud 38 threaded through a shelf 39 projecting from the intermediate portion of the base 10. The adjustability of the stud 38 provides means for shifting the position of the shaft 36 longitudinally so that the distributing disk 33 may rotate freely upon the bottom plate 15 without undue friction. The shaft 36 carries a longitudinally or axially adjustably mounted spur gear 40 held in place as for example by a set screw 41 and meshing with a similar spur gear 42 on a vertical shaft 43 having its upper end recessed and rotatably engaged upon the conical lower end of a stud 45 depending from the top portion 14 of the base. The lower end of the shaft 43 may be similarly recessed and engaged upon a corresponding conically shaped threaded stud 44 extending upwardly from the lower portion or foot 13 of the base. The adjustability of the conical ended studs 44 and 45 enables adjustment to be made so as to insure easy running of the shaft 43 under all conditions.

The means for driving the distributor disk 33 is here disclosed as comprising a star wheel 46 suitably adjustably secured upon the shaft 43, as for instance by means of a set screw 47 and adapted to be engaged by the successive cans 12 as they are moved by or past the machine by the belt or conveyor 11, these cans in their movement furnishing sufficient driving power to effect rotation of the star wheel 46, the shaft 43, spur gear 42, spur gear 40 and shaft 36 carrying the distributor disk 33.

The hopper bottom 19 is disclosed as having at one side an opening 49 extending entirely to the top of the distributor disk 33 so that the salt 27 within the hopper may pass to the successive pockets 34 in the distributor disk and fill them as the disk is rotated. It is of course to be understood that the openings or pockets 34 in the disk 33 are to be made of such size as to contain exactly the predetermined quantity of salt to be introduced within each can and it is clear that as the disk 33 rotates and the successive pockets 34 are filled they will all contain exactly the same amount and all will be emptied successively into the chute 32 and thence into the successive cans carried along by the belt or conveyor 11 in a manner which will be explained in greater detail hereinafter.

It is of course necessary to prevent the mass of salt 27 from caking or hardening within the hopper and in order to prevent such hardening I have found it advisable to provide agitating means here represented as comprising a shaft 50 journaled through the top of the hopper 20 and having its lower end bearing upon the conical tip of a threaded adjustable pivot stud 51 passing through the center of the hopper bottom 19, this type of bearing being particularly advantageous as reducing friction and being free from clogging of any kind. Among other things, adjustably mounting the agitator provides not only for the endwise adjustment of the agitator to insure proper meshing of the gears 55 and 56, but also to provide a positive bearing contact at the lower end of the agitator. Projecting laterally from the shaft 50 as spaced points are agitator fingers 52 which are located at different points throughout the length of the shaft and which are arranged in staggered relation to one another.

For driving the agitating means, use may be made of a low power electric motor or the like indicated at 53 which may be mounted upon a shelf 54 at the top of the hopper and which may have its shaft connected as by gearing 55 and 56 with the upper end of the shaft 50 for driving the same so that reliance need not be placed upon the movement of the cans by the belt or conveyor for driving the agitating mechanism as it is quite conceivable that more power might be needed than would be expected for churning, agitating and breaking up the mass of salt as it tends to harden or cake within the hopper. The adjustment of the stud 51 permits proper meshing of the gearing 55 and 56 between the motor 53 and shaft 50.

In the operation of the device, it is of course understood that the inside of the hopper 20, that is to say the interior of the inner shell or wall 22 thereof must be filled with salt which may be introduced through the opening 28. While salt is referred to throughout the specification it should of course be distinctly understood that if under any circumstances sugar or other granular or powdered material is intended to be placed within canned food products, such may be used in the same manner and to equal advantage and particularly so where they tend to cease to be free flowing in the presence of moisture. However, the importance of the invention is not dependent upon the exact material handled as there is no limitation in this respect. As the cans 12 are moved along by the conveyor or belt 11 the successive cans will engage against and rotate the star wheel 46 and consequently effect rotation of the shaft 43 and by virtue of the intermeshing gears 42 and 40 will rotate the shaft 36 carrying the distributor disk 33. The mass of salt 27 within the hopper passes through the opening 49 in the hopper bottom 19 and fills the successive pockets 34 in the disk 33 as the latter is rotated. It will be noted that but very little weight comes upon the disk 33 as only a small portion thereof is exposed beneath the opening 49 in the hopper bottom so that there will be no retardation of the rotation of the distributing disk. As the disk 33 is moved about in the direction of the arrow in Figure 5 it will be observed that the pockets 34 filled with salt passing through the opening 49 in the hopper bottom 19 will pass successively over the opening 16, the salt then dropping out through the opening 16 in the bottom plate 15 into the chute 32 and being deposited within the successive cans 12 as they pass by. The action of agitating the salt by means of the rotary shaft 50 and fingers 52 projecting therefrom is independent of the driving of the distributor disk 33 by passage of the cans beneath the machine as the separate motor 53 is provided for this purpose. Consequently it is apparent that the action should be free and easy throughout. The agitating means is a very important feature inasmuch as it prevents clogging of the salt which appears to be the greatest objection to known machines for this purpose, it being well known that the atmosphere in canning factories is always extremely damp so that moistening and clogging of salt results.

In actual practice a very convenient way to heat the salt and thereby keep it dry so that it will not harden or cake is to make use of an electric heater instead of either steam or hot air as above described. Consequently I have shown in Figure 8, a modification of the invention. Referring to this figure in detail the hopper 57 is represented as comprising inner and outer walls 58 and 59 respectively having a space between them which is open at the top and which contains an electric heating coil 60 which may be embedded or otherwise mounted in any suitable insulating material or the like indicated at 61. The terminals of this coil are indicated at 62 and are conveniently located at the outside of the hopper for connection of current carrying wires therewith. Of course the above described shaft 50 is journalled axially of the hopper in exactly the same manner as above described. The advantage of using electricity as the heating means is that it gives a dry heat and is very convenient and easy to handle or control.

Above I have described and shown in the drawings what may be called a countershaft means for rotating or driving the shaft 36 through gearings. However, it is not necessary to do this and I may therefore apply the star wheel 46 directly to the lower end of the shaft 63 which is identically the same as the shaft 36 except that it is longer and has its lower end journalled upon a bearing 64 on the foot member 13. By this arrangement it will be seen that the distributor disk 33 will be turned one half way around with respect to position shown for instance in Figures 4 and 5 so that the discharge chute 65 corresponding to the chute 32 will be located at a point diametrically opposite the position shown in Figures 1 and 2. The advantage of this is that the chute 65 may extend downwardly much straighter than the chute 32.

From the foregoing description and a study of the drawings, it is believed that the construction, operation and advantages will be readily apparent to one skilled in the art without further explanation.

While I have shown and described the preferred embodiment of the invention it should be understood that I reserve the right to make all such changes in the details of construction and the arrangement and combination of parts as will not depart from the spirit of the invention or the scope of the subjoined claims.

Having thus described the invention, I claim:

1. A machine of the kind described comprising a cylindrical body having an outer concentrically arranged jacket constituting a space for a heating medium, the said space being substantially the length of the body, a bottom for said body and having a cavity for communication with the body, a distributing disk rotatably fitting said cavity, an agitator within the body, a pivot stud adjustably fitting the bottom and engaged with the lower end of the agitator, a discharge chute depending from the bottom and communicating with the cavity therein, means at the top of the body for imparting rotation to the agitator, and a can feeding means cooperating with the distributing disk and adapted for successively presenting single cans to the discharge chute.

2. In a machine of the character described which is adapted to hold a body of finely divided material that tends to cease to be free flowing in the presence of moisture and automatically measure and dispense predetermined size portions of same as required, the combination which includes an elongated tubular member, a heating means incorporated in the sides of said tubular member, a closure means at the lower end of said tubular member and anchored thereto, said closure means consisting of a member having an opening therethrough in communication with the interior of said elongated tubular member, a measuring disc carrying a plurality of uniform volume measuring pockets in communication with the opening in said closure means, means to automatically operate said measuring disc and a friction reducing cut away supporting member for said disc.

3. In a machine for holding a body of finely divided material which tends to attract moisture and cease to be free flowing, such as commercial loose salt, condition same, and automatically and continuously dispense same in relatively small measured quantities, the combination which includes an elongated tubular hopper, a measuring and dispensing means at the bottom thereof, an endwise adjustable agitator longitudinally mounted in said tubular hopper and having arms mounted thereon to permit agitation of substantially the entire contents of the tubular hopper, and a heating means incorporated in the side surface of said hopper and substantially throughout the length thereof.

4. In a machine for holding a body of finely divided material which tends to attract moisture and cease to be free flowing, such as commercial loose salt, condition same, and automatically and continuously dispense same in relatively small measured quantities, the combination which includes an elongated tubular hopper, a measuring and dispensing means at the bottom thereof, an adjustably mounted agitator within said hopper, and a heating means incorporated in the side surface of said hopper and substantially throughout the length thereof.

5. In a machine of the character described which is adapted to hold a body of finely divided material that tends to cease to be free flowing in the presence of moisture and automatically measure and dispense predetermined size portions of same as required, the combination of an elongated tubular means adapted to hold a body of the aforementioned finely divided material, means including a rotatable measuring member having a plurality of uniform volume pockets to measure predetermined size portions of such material, means to dispense such predetermined size portions, said first named means consisting of a hopper, having sides and a bottom, said sides having incorporated therein a heating means, an agitator adapted to stir substantially the entire contents of the hopper, and a conical tip adjustable bearing in contact with the lower end of said agitator.

6. In a salt handling machine of the character described which is adapted to hold a body of salt in commercial finely divided form and continuously and automatically measure and dispense predetermined size portions of same as desired, the combination which consists of an elongated vertically mounted substantially tubular hopper having sides and a bottom, a steam jacket incorporated in said hopper as a part of the substantially tubular sides thereof, a power driven adjustable vertically mounted agitator in said substantially tubular hopper adapted to agitate substantially the entire contents thereof, a horizontally mounted rotatable measuring disc containing a plurality of uniform volume measuring pockets, at the bottom of said elongated substantially tubular hopper, adapted to continuously receive said salt in commercial finely divided form therefrom and automatically measure predetermined size portions thereof and dispense same, and a means adapted to automatically rotate the measuring disc and cause same to dispense the predetermined size portions of salt at the proper time.

7. A measuring and dispensing apparatus for charging moving cans and the like with a measured quantity of finely divided material that tends to attract moisture and cease to be free flowing, such as commercial loose salt, which includes a conveyor for moving cans, a frame mounted beside said conveyor, a vertical shaft in said frame, a star wheel secured on the shaft and extended over the conveyor in the path of the moving cans, a measuring disc having a plurality of measuring pockets, means for operatively connecting the measuring disc with said vertical shaft, a holding means for said measuring disc, an elongated tubular hopper, a heating means on the sides of said tubular hopper, means for joining the means containing the measuring disc to the lower end of said tubular hopper so as to act as the closure therefor, and an agitator within said elongated tubular hopper adapted to agitate substantially the entire contents thereof.

8. A measuring and dispensing apparatus for charging moving cans and the like with a measured quantity of finely divided material that tends to attract moisture and cease to be free flowing, such as commercial loose salt, which includes a conveyor for moving cans, a vertical shaft, a mechanism secured to said vertical shaft and extending over the conveyor in the path of the moving cans in manner such that the passage of cans thereby will cause a predetermined rotation of the vertical shaft, a rotatable measuring means having a plurality of measuring pockets, means for operatively connecting said measuring means with said vertical shaft, a holding means for said measuring means, a tubular hopper, a heating means in the sides of said tubular hopper, a passageway communicating in operable relation between the interior of said tubular hopper and the interior of said holding means for the measuring means, a means for supporting said hopper at a point higher than said conveyor but at such location that the finely divided material delivered from the measuring means will pass into the cans on the conveyor, an agitator within said tubular hopper adapted to agitate the contents thereof, and means for operating said agitator.

9. A measuring and dispensing apparatus for charging moving cans and the like with a measured quantity of finely divided material that tends to attract moisture and cease to be free flowing, such as commercial loose salt, which includes a conveyor for moving cans, a vertical shaft, a mechanism secured to said vertical shaft and extending over the conveyor in the path of the moving cans in manner such that the passage of cans thereby will cause a predetermined rotation of the vertical shaft, a rotatable measuring means having a plurality of measuring pockets, means for operatively connecting said measuring means with said vertical shaft, a holding means for said measuring means, a tubular hopper, a heating means in the sides of said tubular hopper, a passageway communicating in operable relation between the interior of said tubular hopper and the interior of said holding means for the measuring means, a means adapted to receive the measured finely divided material from the measuring means and deliver same to the cans on the conveyor, a means for supporting said hopper at a point higher than said conveyor but at such location that the finely divided material delivered from the measuring means will pass into the cans on the conveyor, an agitator within said tubular hopper adapted to agitate the contents hereof, and means for operaing said agitator.

10. A measuring and dispensing apparatus for charging moving cans and the like with a measured quantity of finely divided material that tends to attract moisture and cease to be free flowing, such as commercial loose salt, which includes a conveyor for moving cans, a vertical shaft, a mechanism secured to said vertical shaft and extending over the conveyor in the path of the moving cans in manner such that the passage of cans thereby will cause a predetermined rotation of the vertical shaft, a rotatable measuring means having a plurality of measuring pockets, means for operatively connecting said measuring means with said vertical shaft, a holding means for said measuring means, a tubular hopper, a heating means in the sides of said tubular hopper, means for joining said holding means for the measuring means to said tubular hopper, a passageway communicating in operable relation between the interior of said tubular hopper and the interior of said holding means for the measuring means, a means adapted to receive the measured finely divided material from the measuring means and deliver same to the cans on the conveyor, a means for supporting said hopper at a point higher than said conveyor but at such location that the finely divided material delivered from the measuring means will pass into the cans on the conveyor, an agitator within said tubular hopper adapted to agitate the contents thereof, and means for operating said agitator.

11. In a dispensing machine of the character described which is adapted to hold a body of finely divided material that tends to cease to be free flowing in the presence of moisture and automatically measure and dispense predetermined size portions of same as required, the combination which includes a hopper having sides and bottom, a heating means incorporated in the sides of said hopper, a rotatable measuring disc having a plurality of measuring pockets, incorporated in the bottom of said hopper and in communication with the interior thereof, an agitator in said hopper adapted to agitate substantially the entire contents thereof, and means adapted to automatically rotate the measuring disc.

12. In a dispensing machine of the character described which is adapted to hold a body of finely divided material that tends to cease to be free flowing in the presence of moisture and automatically measure and dispense predetermined size portions of same as required, the combination which consists of an elongated tubular hopper having sides and bottom, a heating means incorporated in the sides of said hopper, a rotatable measuring disc having a plurality of measuring pockets, incorporated in the bottom of said hopper and in communication with the interior thereof, an agitator in said hopper adapted to agitate substantially the entire contents thereof, means adapted to automatically rotate the measuring disc, and a dispensing means adapted to receive the measured finely divided material from the measuring means and deliver same to the receiving receptacles.

13. In a machine for holding a body of finely divided material that tends to attract moisture and cease to be free flowing, such as commercial loose salt, condition same, and automatically and continuously dispense same in relatively small measured quantities, the combination which comprises an elongated tubular member provided with a heating means substantially throughout its length, an externally mounted closure member for the lower end of said tubular member, a measuring and distributing member rotatably fitting said closure member and adapted to receive by gravity flow from the interior of said elongated tubular member, a material such as commercial loose salt, and continuously and uniformly measure and dispense same, an agitator within said tubular member adapted to agitate substantially the entire contents thereof, and means for operating the agitator.

14. In a machine for holding a body of finely divided material which tends to attract moisture and cease to be free flowing, such as commercial loose salt, condition same, and automatically and continuously dispense same in relatively small measured quantities, the combination which includes a hopper having a heating means incorporated in the sides thereof, an agitator within said hopper, a dispensing means at the bottom of said hopper, a rotatable measuring means operatively positioned between said hopper and said dispensing means, and a shaft carrying said measuring means, said shaft being adjustable endwise to reduce friction on said rotatable measuring means.

15. In a machine for holding a body of finely divided material that tends to attract moisture and cease to be free flowing, such as commercial loose salt, condition same, and automatically and continuously dispense same in relatively small measured quantities, the combination which comprises a hopper with sides and bottom, a heating means incorporated in the sides of said hopper, a rotatable agitator in said hopper, an adjustable pivot on the bottom of said hopper in engagement with the lower end of the agitator, and a mechanism including a rotatable measuring device at the bottom of said hopper adapted to receive and measure portions of said finely divided material from said hopper and dispense same.

16. In a machine for holding a body of finely divided material that tends to attract moisture and cease to be free flowing, such as commercial loose salt, condition same, and automatically and continuously dispense same in relatively small measured quantities, the combination which comprises an open ended elongated tubular member adapted to act as a hopper for said body of finely divided material when closed at its lower end, said tubular member being double walled substantially throughout its length to provide a cavity for a heating medium, inlet and outlet connections to said cavity for supplying and removing the heating medium therefrom, a hollow closure member for the lower end of said tubular member and having a passageway in communication between the interior of said tubular member and the interior of said closure member, and a discharge opening from said closure member, a measuring and distributing member rotatably fitting the interior of said hollow closure member, an agitator within said tubular member, adapted to agitate substantially the entire contents thereof, and means for operating the agitator.

17. In a machine for holding a body of finely divided material that tends to attract moisture and cease to be free flowing, such as commercial loose salt, condition same, and automatically and continuously dispense same in relatively small measured quantities, the combination which comprises an open ended elongated tubular member adapted to act as a hopper for said body of finely divided material when closed at its lower end, said tubular member being double walled substantially throughout its length to provide a cavity for a heating medium, inlet and outlet connections to said cavity for supplying and removing the heating medium therefrom, a hollow closure member for the lower end of said tubular member and having a passageway in communication between the interior of said tubular member and the interior of said closure member, and a discharge opening from said closure member, a measuring and distributing member rotatably fitting the interior of said hollow closure member, an agitator within said tubular member, an adjustable means mounted at the closure end of said tubular member and engaged with the lower end of said agitator, and means for operating the agitator.

18. In a machine for holding a body of finely divided material that tends to attract moisture and cease to be free flowing, such as commercial loose salt, condition same, and automatically and continuously dispense same in relatively small measured quantities, the combination which comprises an open ended elongated tubular member adapted to act as a hopper for said body of finely divided material when closed at its lower end, said tubular member being double walled substantially throughout its length to provide a cavity for a heating medium, inlet and outlet connections to said cavity for supplying and removing the heating medium therefrom; a closure member for the lower end of said tubular member, said closure member being hollow and having upper and lower parts, the upper part having a passageway therethrough for communication between said tubular member hopper and the hollow space in the closure member, the lower part having a passageway therethrough to provide a discharge opening from the hollow space in said closure member, a measuring and distributing disc rotatably mounted within said hollow space of the closure member and adapted to have the measuring portions of said disc first communicate with the interior of said hopper through the passageway in the upper part of said closure member, and upon rotation out of communication with said passageway, to come into communication with the discharge passageway in the lower part of the closure member, the lower part of the closure member being cut away to reduce friction when the measuring and distributing disc is rotated thereover, and yet provide ample support for the disc as well as the contents thereof while being moved from the receiving to the delivering points, an agitator within said tubular member, means at the top of said tubular member for rotating said agitator, and an adjustable pivot stud on the top part of said closure member engaging with the lower end of the agitator.

19. In a machine for holding a body of finely divided material that tends to attract moisture and cease to be free flowing, such as commercial loose salt, condition same, and automatically and continuously dispense same in relatively small measured quantities, the combination which comprises an open ended elongated tubular member adapted to act as a hopper for said body of finely divided material when closed at its lower end, said tubular member being double walled substantially throughout its length to provide a cavity for a heating medium, inlet and outlet connections to said cavity for supplying and removing the heating medium therefrom; a closure member for the lower end of said tubular member, said closure member being hollow and having upper and lower parts, the upper part having a passageway therethrough for communication between said tubular member hopper and the hollow space in the closure member, the lower part having a passageway therethrough to provide a discharge opening from the hollow space in said closure member, a measuring and distributing disc rotatably mounted within said hollow space of the closure member and adapted to have the measuring portions of said disc first communicate with the interior of said hopper through the passageway in the upper part of said closure member, and upon rotation out of communication with said passageway, to come into communication with the discharge passageway in the lower part of the closure member, the lower part of the closure member being cut away to reduce friction when the measuring and distributing disc is rotated thereover, and yet provide ample support for the disc as well as the contents thereof while being moved from the receiving to the delivering points; an agitator within said tubular member, means at the top of said tubular member for rotating said agitator, and an adjustable pivot stud on the top part of said closure member engaging with the lower end of the agitator; and a can feeding means cooperating with the measuring and distributing disc and adapted for successively presenting single cans to the point of discharge of the finely divided material.

HARVEY LEE BIRD.